(12) United States Patent
Ryu

(10) Patent No.: US 6,321,227 B1
(45) Date of Patent: Nov. 20, 2001

(54) WEB SEARCH FUNCTION TO SEARCH INFORMATION FROM A SPECIFIC LOCATION

(75) Inventor: Yeon-Seung Ryu, Seoul (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/236,109

(22) Filed: Jan. 25, 1999

(30) Foreign Application Priority Data

Feb. 6, 1998 (KR) .................................................... 98/3448

(51) Int. Cl.$^7$ .................................................... G06F 17/30
(52) U.S. Cl. ................................... 707/10; 707/1; 707/2; 707/3; 707/4; 707/5; 707/6; 707/501; 707/513; 709/218
(58) Field of Search ................................. 707/1–10, 501, 707/513; 709/240, 218

(56) References Cited

U.S. PATENT DOCUMENTS

| | | |
|---|---|---|
| 5,787,254 | 7/1998 | Maddalozzo Jr. et al. . |
| 5,890,152 * | 3/1999 | Rapaport et al. ....................... 707/6 |
| 5,930,474 | 7/1999 | Dunworth et al. . |
| 6,014,090 | 1/2000 | Rosen et al. . |
| 6,041,326 * | 3/2000 | Amro et al. ......................... 707/10 |
| 6,052,439 | 4/2000 | Gerszberg et al. . |
| 6,067,552 * | 5/2000 | Yu ....................................... 707/501 |
| 6,085,186 * | 7/2000 | Christianson et al. .................. 707/3 |
| 6,144,962 * | 11/2000 | Weinberg et al. ..................... 707/10 |

OTHER PUBLICATIONS

"Downloaded HELP page from AltaVista™". (Obtained on Jan. 6, 1999, reference data unknown).
Printout (3 pages) of YAHOO! Yellow Pages Results dated Jan. 07, 1999.
Copy of U.S. Application Serial No. 09/234,370, filed on Jan. 21, 1999.

* cited by examiner

Primary Examiner—Hosain T. Alam
Assistant Examiner—Anh Ly
(74) Attorney, Agent, or Firm—Robert E. Bushnell, E

(57) ABSTRACT

A method for providing information placed in the specific location after analyzing the locations of the information is disclosed. Web search function to search information placed in the specific location comprises the steps of inputting the keywords and the locations of the desired information on the web browser by the web searcher, searching the indexes according to the keywords and the locations by the web search server, finding the URLs (Uniform Resource Locator) of the searched indexes by the web search server, comparing the URLs with the inputted locations, and transmitting the compared results to the web searcher. The present invention reduces the amount of the transmitting data, transmitting time, the amount of the data to be stored in the computer of the web searcher, and prevents the web searcher from sorting the searched pages case by case.

34 Claims, 3 Drawing Sheets

FIG. 3

1. <u>Java Beans - Related APIs</u>
   Java. TM. Beans - Related APIs. The Java Beans APIs are also closely related to other new java core APIs which are described in separate documents. "The...
   http://splash.javasoft.com/beans/related.html - size 2K - 14-Apr-97 - English

FIG. 4

1) <u>Java Checker for personal use.</u>
   Java Applet Checker. This clock works on JAVA-Alpha clients. (e.g., hotjava) This clock works on JAVA-Beta clientsa. (e.g., netscape) I can't understa.
   http://133.24.124.83/~y0026/java!/index.html [100%]

THE URL OF THE CORRESPONDING WEB PAGE

APPROXIMATION OF THE KEYWORD REQUESTED BY THE USER (IN THIS CASE, THE KEYWORD IS "JAVA")

ns from a specific location

WEB SEARCH FUNCTION TO SEARCH INFORMATION FROM A SPECIFIC LOCATION

CLAIM OF PRIORITY

This application makes reference to, incorporates the same herein, and claims all benefits accruing under 35 U.S.C. §119 from an application for WEB SEARCH METHOD SEARCHING INFORMATION PLACED IN SPECIFIC LOCATION earlier filed in the Korean Industrial Property Office on the Feb. 6$^{th}$, 1998 and there duly assigned Ser. No. 98-3448.

BACKGROUND OF THE INVENTION

1. Field of the Invention

The present invention relates to the field of information processing system organization, and more particularly to internet search engines.

2. Description of the Related Art

Conventional web search servers have their own search robots periodically circulating among web servers providing web services all over the world and visiting various web pages. The web search servers analyze the contents of the web pages and build the indexes or the references and store them. The indexes or the references include the summary and the URLs (Uniform Resource Locator) of the web information.

In case of utilizing the web search servers, the web searchers contact the web search server sites through the web browsers. When the web searcher inputs the keywords for the desired information, the web search engine searches the previously built-in indexes or the references and transmits the URLs of the desired information to the web searcher.

When searching using some search engines, such as the Altavista (TM) search engine, the method of ordering the obtained information is not displayed to the user, and the goodness of fit to the keywords of each obtained web page is not shown. In other search engines, such as the Lycos (TM) search engine, the display shows a contents approaching method in which the display order is prioritized starting from the web page of closest match to the keywords.

But, because of the large number of search results, due to the heavy amount of information on the internet, it is not easy for the web searcher to find desired information in a short time. In particular, when displaying the searched information to the web searcher in the conventional methods, the locations of the information are not displayed. For example, the information about which countries, universities, or companies the searched information belongs is not displayed or automatically obtained. If the web searcher wants to find the information belonging to a specific university, the web searcher will often re-analyze the URLs that resulted from the information search results. Because unnecessary information is also transmitted, the amount of use of the network and the time to receive the information increase.

SUMMARY OF THE INVENTION

It is therefore an object of the present invention to provide an improved method for searching for information on the internet.

It is a further object of the present invention to provide a method for searching and providing the information from a specific location.

It is also an object of the present invention to provide a method for searching and providing the information from a specific university or company.

To achieve these objects, a web search function to search information from a specific location includes the steps of: inputting the keywords and the locations of the desired information on the web browser by the web searcher; searching the indexes according to the keywords and the locations by the web search server; finding the URLs (Uniform Resource Locator) of the searched indexes by the web search server; comparing the URLs with the inputted locations; and transmitting the compared results to the web searcher.

The URLs and the inputted locations are compared by utilizing the URL location mapping table(ULMT). If the comparison fails, that is, if the location cannot be obtained from the URL, the IP(Internet Protocol) addresses of the URLs and the inputted locations are compared by utilizing the IP location mapping table(ILMT).

The step of the comparing the URLs with the inputted locations includes the steps of: checking whether or not respective searched URLs are identical with the location inputted by the web searcher by utilizing the ULMT; finding the respective IP addresses corresponding to the URLs, in case the searched URLs are not identical with the location inputted by the web searcher; checking whether or not the respective IP addresses are identical with the location inputted by the web searcher by utilizing the ILMT; regarding as an exceptional case, in case the IP address is not identical with the location inputted by the web searcher; checking whether or not the checked URLs, IP addresses, and exceptional cases correspond to the information requested by the web searcher; and not displaying the checked information, in case the checked information does not correspond to the information requested by the web searcher; and checking whether or not the URLs, IP addresses, and exceptional cases are all sorted.

In the step of inputting the keywords, the logical arithmetic command is utilized for the inputting method. In the step of inputting the locations, the logical arithmetic command and/or the hierarchical structure is utilized for the inputting method.

The ULMT matching the URLs and the corresponding locations by the search server is previously built. The ILMT matching the IP addresses and the corresponding locations by the search server is previously built. In the step of regarding as an exceptional case, the step of transmitting the result of the exceptional cases to the web searcher is further included.

BRIEF DESCRIPTION OF THE DRAWINGS

FIG. 3 illustrates a display of the searched result in case of searching the keyword 'java' on the Altavista (TM) search engine;

FIG. 4 illustrates a display of the searched result in case of searching the keyword 'java' on the Lycos (TM) search engine;

DETAILED DESCRIPTION OF THE PREFERRED EMBODIMENTS

Figure 1:
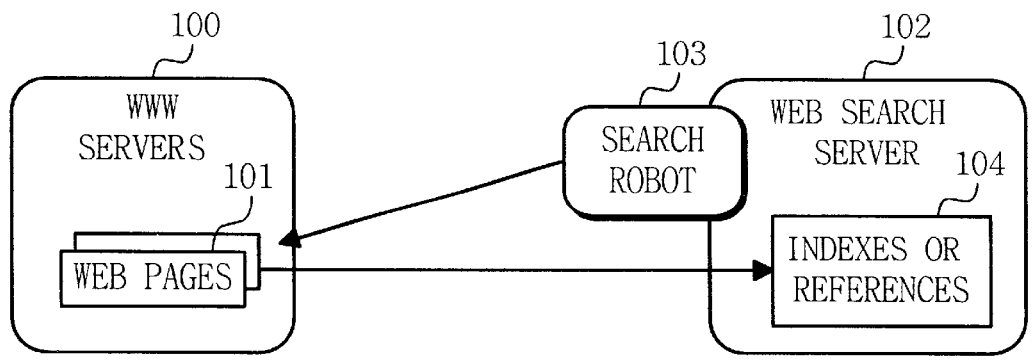
FIG. 1 illustrates a diagram for searching the information by the web search servers according to the prior art.

Turning now to the drawings, FIG. 1 is a diagram illustrating the general scheme for the searching of informatio by a web search servers according to the prior art as described above. Conventional web search servers 102 have their own search robots 103 periodically circulating among web servers 100 providing web services all over the world and visiting various web pages 101. The web search servers analyze the contents of the web pages and build the indexes or the references 104 and store them. The indexes or the references include the summary and the URLs(Uniform Resource Locator) of the web information.

Figure 2:
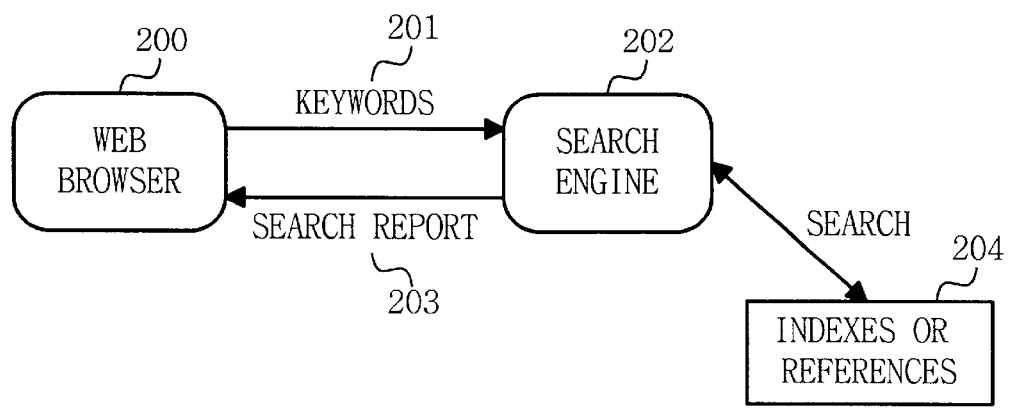
FIG. 2 illustrates a diagram for searching the information by utilizing the web search engine according to the prior art.

FIG. 2 illustrates a diagram for searching the information by utilizing the web search engine according to the prior art. In case of utilizing the web search servers, the web searchers contact the web search server sites through web browsers 200. When the web searcher, that is, the user, inputs keywords 201 for the desired information, web search engine 202 searches the previously built-in indexes or references 204 and transmits URLs 203 of the desired information to the web searcher.

FIG. 3 illustrates a display of the searched result in the case of searching the term 'java' on the Altavista (TM) search engine, and FIG. 4, in the case of the Lycos (TM) search engine. The displaying the URLs of the searched information in FIG. 3 shows a display method in which the closeness of the found information to the keyword is not given, and the order of the display is not obvious to the user. FIG. 4 shows a contents approaching method in which the display order is prioritized starting from the one closest to the keywords, and a percentage value is given indicating the approximated closeness of the contents of the page to the keywords.

Figure 5:
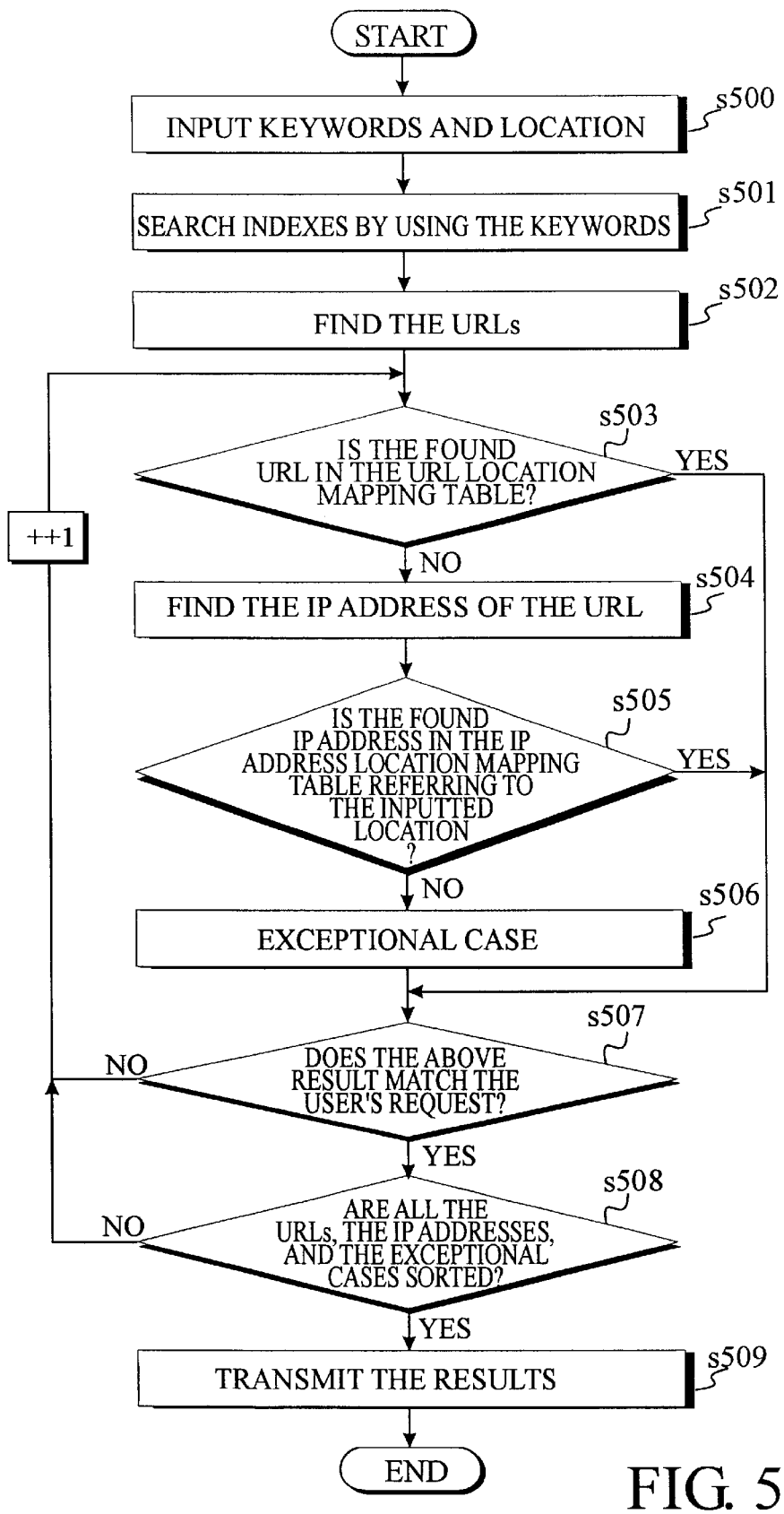
FIG. 5 illustrates a flow chart for searching the information in a specific location according to the present invention.

The present invention will now be described in detail with reference to the figures. Referring to FIG. 5, after the web searcher contacts a web server by utilizing a web browser, the web searcher inputs the keywords and the locations of the desired information at step s500. In case of inputting the keywords, a logical arithmetic command, such as "java and ATM", which uses a Boolean conjunction, may be utilized. In case of inputting the locations, the options set up by the program are selected, instead of the web searcher's random inputting.

As described, this invention allows the user to easily and efficiently perform a web search based on locational information about the web page.

Hierarchical structure may also be adopted. For example, in the first menu, a "Nation" option may be displayed. When "Nation" is selected, "Asia, North America, . . . " are displayed, and further options may be selected. When inputting the locations, a logical arithmetic command may be used. For example, inputting a phrase such as "Korea and university" is allowed. The inputted keywords are utilized for the purpose of finding the desired pages and the corresponding URLs through the index search of the web search engine, at step s501.

When the pages and the corresponding URLs are found, at step s502, the URLs are analyzed. The URLs have the information on the nationality, organization, and etc. For example, the URL of 'www.samsung.co.kr' has information on the nationality, i.e., Korea and the company, i.e., Samsung. The above-noted kind of information is previously built in the URL location mapping table (ULMT). In step s503, whether or not the searched URL is found in the ULMT is checked.

In the case where the searched URL is not found in the ULMT, the IP address of the corresponding URL is found in step s504. In some cases, it is possible to find the information on the nationality and organization through the IP address. Such information is previously built in the IP location mapping table (ILMT). Whether or not the IP address is found in the ILMT is checked in step s505. In case the URL is not found in the ULMT and the ILMT, it is regarded as an exceptional case to be reported to the web searcher, at step s506.

In case the URL is found in the ULMT or in the ILMT, the fact whether or not the URL is requested by the web searcher is checked. If the URL is not requested by the web searcher, it is not transmitted to the web searcher, at step s507. The fact whether or not all the URLs, the IP addresses and the exceptional cases are sorted is checked, at step s508. The sorted results are transmitted to the web searcher, at step s509.

What is claimed is:

1. A method of searching for information on a network from a specific location, comprising the steps of:

inputting by a user for a search a keyword and a location of desired information to a web browser;

searching an index by a web search server according to the keyword input by the user, and retrieving any of each found uniform resource locator having a corresponding page that corresponds to the keyword input by the user;

comparing each retrieved and found uniform resource locator with the location input by the user using a uniform resource locator mapping table to determine each corresponding page for a corresponding retrieved and found uniform resource locator that corresponds to the location input by the user; and transmitting a result of the comparing step to the user.

2. The method of claim 1, further comprised of said comparing step comprises determining whether each said retrieved and found uniform resource locator is in said uniform resource locator mapping table to determine each corresponding page that corresponds to the location input by the user.

3. The method of claim 2, further comprising the step of generating said uniform resource locator mapping table before the search.

4. The method of claim 1, further comprised of said comparing step comprises also using an internet protocol location mapping table to determine whether a corresponding retrieved and found uniform resource locator has a corresponding internet protocol address that is found in said internet protocol location mapping table to determine each corresponding page that corresponds to the location input by the user.

5. The method of claim 4, further comprising the step of generating said internet protocol location mapping table before the search.

6. The method of claim 1, further comprising the substeps of:

in said comparing step, determining whether each said retrieved and found uniform resource locator is found in said uniform resource locator mapping table;

when a retrieved and found uniform resource locator is not found in said uniform resource locator mapping table, then determining whether a corresponding internet protocol address for the retrieved and found uniform resource locator that is not found in said uniform resource locator mapping table is found in an internet protocol location mapping table;

when the corresponding internet protocol address for the retrieved and found uniform resource locator that is not found in said uniform resource locator mapping table is also not found in said internet protocol location mapping table, then sorting the retrieved and found uniform resource locator that is not found in said uniform resource locator mapping table and is also not found in said internet protocol location mapping table as an exceptional case; and in said transmitting step, transmitting information about any retrieved and found uniform resource locator that is an exceptional case.

7. The method of claim 6, further comprising the step of generating said uniform resource locator mapping table before the search.

8. The method of claim 6, further comprising the step of generating said internet protocol location mapping table before the search.

9. The method of claim 1, further comprised of a keyword being input by the user with a corresponding Boolean conjunction for commanding a Boolean search.

10. The method of claim 1, further comprised of a location being input by the user with a corresponding Boolean conjunction.

11. The method of claim 1, further comprised of said inputting step further comprises the step of:

selecting a location to be input by the user for the search from a hierarchical menu of locations offered on the web browser.

12. The method of claim 6, further comprised of a keyword being input by the user with a corresponding Boolean conjunction for commanding a Boolean search.

13. The method of claim 6, further comprised of a location being input by the user for the search with a corresponding Boolean conjunction.

14. The method of claim 6, further comprised of said inputting step further comprises the step of:

selecting a location to be input by the user for the search from a hierarchical menu of locations offered on the web browser.

15. The method of claim 6, further comprising the steps of:

generating said uniform resource locator mapping table before the search; and generating said internet protocol location mapping table before the search.

16. The method of claim 4, further comprising the steps of:

generating said uniform resource locator mapping table before the search; and generating said internet protocol location mapping table before the search.

17. A method of searching for information on a network from a specific location, comprising the steps of:

inputting by a user for a search at least one keyword and at least one location of desired information to a web browser;

searching at least one index by a web search server according to the at least one keyword input by the user, and retrieving any of each found uniform resource locator having a corresponding page that corresponds to the at least one keyword input by the user;

comparing each retrieved and found uniform resource locator with the at least one location input by the user using a uniform resource locator mapping table to determine each corresponding page for a corresponding retrieved and found uniform resource locator that corresponds to the at least one location input by the user; and transmitting a result of the comparing step to the user.

18. The method of claim 17, further comprised of said comparing step comprises determining whether each said retrieved and found uniform resource locator is in said uniform resource locator mapping table to determine each corresponding page that corresponds to the at least one location input by the user.

19. The method of claim 17, further comprising the step of generating said uniform resource locator mapping table before the search.

20. The method of claim 17, further comprised of said comparing step comprises also using an internet protocol location mapping table to determine whether a corresponding retrieved and found uniform resource locator has a corresponding internet protocol address that is found in said internet protocol location mapping table to determine each corresponding page that corresponds to the at least one location input by the user.

21. The method of claim 20, further comprising the step of generating said internet protocol location mapping table before the search.

22. The method of claim 20, further comprising the steps of:

generating said uniform resource locator mapping table before the search; and generating said internet protocol location mapping table before the search.

23. The method of claim 17, further comprised of the at least one keyword comprising a plurality of keywords.

24. The method of claim 17, further comprised of the at least one location comprising a plurality of locations.

25. The method of claim 24, further comprised of the at least one keyword comprising a plurality of keywords.

26. The method of claim 25, further comprised of the at least one index comprising a plurality of indexes.

27. The method of claim 17, further comprised of the at least one index comprising a plurality of indexes.

28. The method of claim 17, further comprising the sub-steps of:

in said comparing step, determining whether each said retrieved and found uniform resource locator is found in said uniform resource locator mapping table;

when a retrieved and found uniform resource locator is not found in said uniform resource locator mapping table, then determining whether a corresponding internet protocol address for the retrieved and found uniform resource locator that is not found in said uniform resource locator mapping table is found in an internet protocol location mapping table;

when the corresponding internet protocol address for the retrieved and found uniform resource locator that is not found in said uniform resource locator mapping table is also not found in said internet protocol location mapping table, then sorting the retrieved and found uniform resource locator that is not found in said uniform resource locator mapping table and is also not found in said internet protocol location mapping table as an exceptional case; and in said transmitting step, transmitting information about any retrieved and found uniform resource locator that is an exceptional case.

29. The method of claim 28, further comprising the steps of:

generating said uniform resource locator mapping table before the search; and generating said internet protocol location mapping table before the search.

30. The method of claim 28, further comprised of the at least one keyword comprising a plurality of keywords.

31. The method of claim 28, further comprised of the at least one location comprising a plurality of locations.

32. The method of claim 31, further comprised of the at least one keyword comprising a plurality of keywords.

33. The method of claim 32, further comprised of the at least one index comprising a plurality of indexes.

34. The method of claim 28, further comprised of the at least one index comprising a plurality of indexes.

* * * * *